United States Patent
Senba

(10) Patent No.: US 9,167,077 B2
(45) Date of Patent: Oct. 20, 2015

(54) SURGE PROTECTION CIRCUIT AND COMMUNICATION APPARATUS

(71) Applicant: FUJITSU LIMITED, Kawasaki-shi, Kanagawa (JP)

(72) Inventor: Yasuhiro Senba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 40 days.

(21) Appl. No.: 14/098,913

(22) Filed: Dec. 6, 2013

(65) Prior Publication Data

US 2014/0211359 A1    Jul. 31, 2014

(30) Foreign Application Priority Data

Jan. 30, 2013    (JP) ................. 2013-015599

(51) Int. Cl.
     *H02H 9/08*      (2006.01)
     *H04M 1/74*      (2006.01)
     *H04L 29/00*      (2006.01)

(52) U.S. Cl.
     CPC ............... *H04M 1/745* (2013.01); *H02H 9/08* (2013.01); *H04L 29/00* (2013.01)

(58) Field of Classification Search
     CPC .......... H02H 9/08; H04L 29/00; H04M 1/745
     USPC ...................................................... 361/119
     See application file for complete search history.

(56) References Cited

U.S. PATENT DOCUMENTS 6,160,887 A * 12/2000 Goodrich ................. 379/412
2012/0262832 A1 * 10/2012 Adomaitis et al. ........... 361/119

FOREIGN PATENT DOCUMENTS

| JP | 05-316641 A | 11/1993 |
| JP | 2001-327069 A | 11/2001 |
| JP | 2002-077454 A | 3/2002 |
| JP | 2005-064732 A | 3/2005 |

* cited by examiner

*Primary Examiner* — Scott Bauer
(74) *Attorney, Agent, or Firm* — Arent Fox LLP

(57) ABSTRACT

A surge protection circuit includes a first terminal that is coupled to a transmission path, a second terminal that is coupled to a PHY circuit to transfer a signal on a physical layer, a clamping unit that is coupled so as to branch from a first line between the first terminal and the second terminal, the clamping unit clamping a voltage applied to the first terminal to a specific clamping voltage, and a first semiconductor switch that is arranged between the second terminal and a branching point at which the clamping unit branches from the first line, the first semiconductor switch having a rectification direction away from the second terminal toward the first terminal, the first semiconductor switch having a higher reverse breakdown voltage than a clamping voltage of the clamping unit.

14 Claims, 9 Drawing Sheets

SURGE PROTECTION CIRCUIT AND COMMUNICATION APPARATUS

CROSS-REFERENCE TO RELATED APPLICATION

This application is based upon and claims the benefit of priority from the prior Japanese Patent Application No. 2013-015599 filed on Jan. 30, 2013, the entire contents of which are incorporated herein by reference.

FIELD

The embodiments discussed herein are related to a surge protection circuit and a communication apparatus.

BACKGROUND

There has been a subscriber line interface circuit, in a digital method, that has a terminating resistor, a surge protection circuit, a power supply transformer, and transmission and reception circuit. In this surge protection circuit, which protects the subscriber line interface circuit from an external lightning surge, two protection elements (first protection element and a second protection element), in each of which a Zener diode is bi-directionally connected in series, are connected in series. In this structure, a third protection element and a fourth protection element are connected in series. The first protection element is connected to an end of a line and the fourth protection element is connected to the other end of the line. A connection point between the second protection element and the third protection element is grounded (see Japanese Laid-open Patent Publication No. 05-316641, for example).

There has been also a lightning surge protection circuit included in an integrated services digital network (ISDN) terminal apparatus in which a bi-directional constant-voltage diode is connected between two terminals on the primary side of a transformer. Two resistors are connected in series with one terminal on the primary side of the transformer, and other two resistors are connected in series with the other terminal on the primary side of the transformer. A first silicon surge protection element is connected between an earth circuit and a first connection point between the two resistors connected to the one terminal on the primary side of the transformer. A second silicon surge protection element is connected between the earth circuit and a second connection point between the other two resistors connected to the other terminal on the primary side of the transformer. A third silicon surge protection element is further connected between the first connection point and the second connection point. The structure, described above, of the lightning surge protection circuit is provided to protect a transformer and its secondary circuit from a lightning surge (see Japanese Laid-open Patent Publication No. 2002-077454, for example).

SUMMARY

According to an aspect of the invention, a surge protection circuit includes a first terminal that is coupled to a transmission path; a second terminal that is coupled to a PHY circuit to transfer a signal on a physical layer; a clamping unit that is coupled so as to branch from a first line between the first terminal and the second terminal, the clamping unit clamping a voltage applied to the first terminal to a specific clamping voltage; and a first semiconductor switch that is arranged between the second terminal and a branching point at which the clamping unit branches from the first line, the first semiconductor switch having a rectification direction away from the second terminal toward the first terminal, the first semiconductor switch having a higher reverse breakdown voltage than a clamping voltage of the clamping unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a conventional surge protection circuit, a first surge protection element to a fourth surge protection element are provided between lines or a first silicon surge protection element to a third silicon surge protection element are provided between lines, so a large stray capacitance is generated.

If a surge protection circuit with a large stray capacitance is used for a high-speed local area network (LAN) based on the Ethernet (registered trademark) or other high-speed transmission paths, transmission characteristics are deteriorated due to a stray capacitance, making it difficult to adapt to the high-speed transmission paths.

Technology that provides a surge protection circuit and a communication apparatus that are appropriate for high-speed transmission paths will be described below with reference to the drawings. Structures in the embodiments below are only examples and the present disclosure is not limited to the structures described in these embodiments.

First Embodiment

Figure 1:
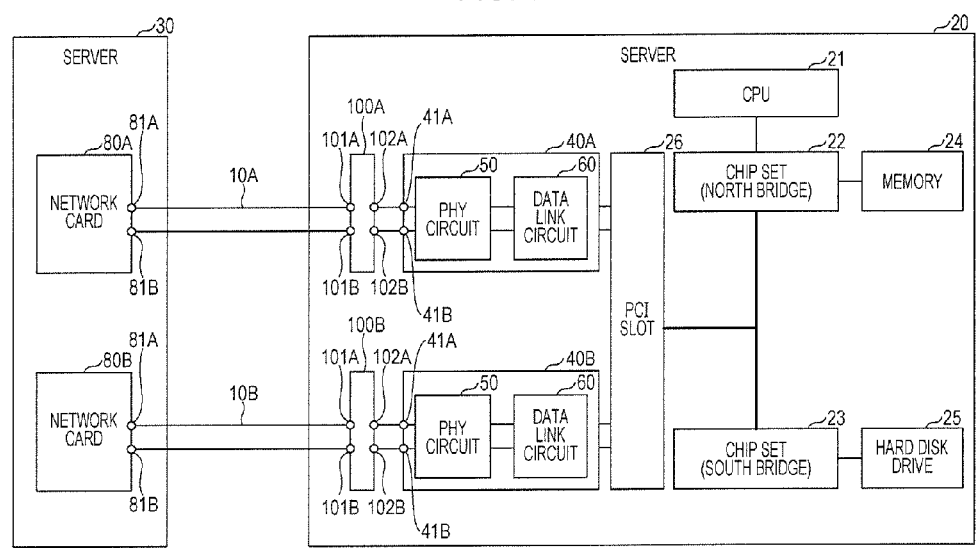
FIG. 1 illustrates a state in which a server including surge protection circuits in a first embodiment is connected to another server through high-speed transmission paths.

FIG. 1 illustrates a state in which a server 20 including surge protection circuits 100A and 100B in a first embodiment is connected to a server 30 through high-speed transmission paths 10A and 10B.

The high-speed transmission paths 10A and 10B are, for example, high-speed local area network (LAN) cables based on the Ethernet (registered trademark). These paths are an example of high-speed transmission paths conforming to the 1000BASE-T standard, which achieves a communication speed of 1 Gbps.

The high-speed transmission paths 10A and 10B are not limited to high-speed transmission paths based on the Ethernet (registered trademark); they may be high-speed transmission paths conforming to another standard. The communication speed of the high-speed transmission paths 10A and 10B is not limited to communication speeds stipulated in the 1000BASE-T standard; they may be high-speed transmission paths with another communication speed or may be high-speed transmission paths conforming to another standard.

The high-speed transmission paths 10A and 10B interconnect the server 20 and server 30. The high-speed transmission paths 10A and 10B each include a pair of signal lines as indicated by the solid lines in FIG. 1.

In the first embodiment, at least part of the high-speed transmission paths 10A and 10B passes through the outdoors to interconnect the server 20 and server 30.

As an example, the high-speed transmission path 10A is used to transmit data from the server 20 to the server 30 and the high-speed transmission path 10B is used to receive data from the server 30 at the server 20 (to transmit data from the server 30 to the server 20). These data transmission directions are an example; data may be transmitted in reverse directions to the directions described above.

The server 20, which includes the surge protection circuits 100A and 100B as described above, is connected to the high-speed transmission paths 10A and 10B through the surge protection circuits 100A and 100B. The server 20 is an example of a communication apparatus or information processing apparatus that includes the surge protection circuits 100A and 100B.

In the first embodiment, a mode will be described in which if lightning strikes the high-speed transmission path 10A or 10B, the server 20 is protected from a surge voltage generated due to the lightning by using the surge protection circuit 100A or 100B.

In addition to the surge protection circuits 100A and 100B, the main constituent elements of the server 20 include a central processing unit (CPU) 21, chip sets 22 and 23, a memory 24, a hard disk drive 25, a Peripheral Components Interconnect (PCI) slot 26, and network cards 40A and 40B. The server 20 may further include a Universal Serial Bus (USB) connector, a graphics unit, and Basic Input Output System (BIOS) read-only memory (ROM), but they are not illustrated in FIG. 1.

The CPU 21 is connected to the chip set 22 and is further connected to the chip set 23, the memory 24, which is a main storage unit, and PCI slot 26 through the chip set 22. The CPU 21 executes computation processing while, for example, reading or writing data from or to the memory 24 through the chip set 22. The CPU 21 is an example of a computation processing unit.

The chip set 22, which is a chip set used as a so-called north bridge, includes a memory controller, a graphics interface, and other control circuits. The CPU 21, chip set 23, memory 24, and PCI slot 26 are connected to the chip set 22 through a bus.

The chip set 23, which is a chip set used as a so-called south bridge. If the server 20 includes a USB connector, a graphics unit, a BIOS ROM, and the like, the chip set 23 includes, for examples, input-output (I-O) ports to which to connect the USB connector, graphics unit, BIOS ROM, and the like.

The memory 24, which is a main storage unit of the server 20, may be, for example, a dynamic random access memory (DRAM). The memory 24 is connected to the CPU 21 through the chip set 22, enabling the CPU 21 to read or write data from and to the memory 24.

The hard disk drive 25, which is an external storage unit, is connected to the chip set 23 through a bus. The hard disk drive 25 stores data used by the CPU 21 to perform computation processing, data resulting from computation processing performed by the CPU 21, and data entered into the server 20 through the PCI slot 26, a USB connector, or the like.

The PCI slot 26 is a slot to which to connect, for example, an external memory or a network card that has a connector, terminals, or the like complying with the PCI standard.

The network cards 40A and 40B are inserted into the PCI slot 26. The network card 40A is provided to connect the server 20 to the high-speed transmission path 10A, and the network card 40B is provided to connect the server 20 to the high-speed transmission path 10B.

The network card 40A is connected to the high-speed transmission path 10A through the surge protection circuit 100A, and the network card 40B is connected to the high-speed transmission path 10B through the surge protection circuit 100B. Paired terminals 41A and 41B of the network card 40A are respectively connected to terminals 102A and 102B of the surge protection circuit 100A, and paired terminals 41A and 41B of the network card 40B are respectively connected to terminals 102A and 102B of the surge protection circuit 100B.

The network card 40A of the server 20 transmits data to a network card 80A in the server 30 through the surge protection circuit 100A and high-speed transmission path 10A. The network card 40B of the server 20 receives data from a network card 80B in the server 30 through the high-speed transmission path 10B and surge protection circuit 100B.

The network cards 40A and 40B each include a PHY circuit 50 and a data link circuit 60.

The PHY circuit 50 performs data transfer on the first layer, which is a so-called physical layer, of seven layers representing protocol functions in a network. The PHY circuit 50 may be a PHY chip that has high-speed communication functions and functions that convert data from analog to digital (AD conversion) and from digital to analog (DA conversion).

The data link circuit 60 performs data transfer in the second layer, which is a so-called data link layer, of the seven layers representing protocol functions in a network. The data link circuit 60 transmits and receives digital data to and from the PHY circuit 50 and also transmits and receives digital data to and from the PCI slot 26.

The network card 40A includes a choke coil (not illustrated in FIG. 1) or a combination of a choke coil and a pulse transformer (not illustrated in FIG. 1) between the PHY circuit 50 and the paired terminals 41A and 41B. Similarly, the network card 40B includes a choke coil (not illustrated in FIG. 1) or a combination of a choke coil and a pulse transformer (not illustrated in FIG. 1) between the PHY circuit 50 and the paired terminals 41A and 41B.

The server 30 has the same structure as the server 20 except that the surge protection circuits 100A and 100B included in the server 20 are removed and the network cards 80A and 80B are included instead of the network cards 40A and 40B.

In FIG. 1, only the network cards 80A and 80B are illustrated as the constituent elements of the server 30 and other constituent elements are not illustrated for simplicity. Paired terminals 81A and 81B of the network card 80A are connected to the high-speed transmission path 10A. Paired terminals 81A and 81B of the network card 80B are connected to the high-speed transmission path 10B.

The network card 80A in the server 30 receives data from the network card 40A in the server 20 through the surge protection circuit 100A and high-speed transmission path 10A. The network card 80B in the server 30 transmits data to the network card 40B in the server 20 through the high-speed transmission path 10B and surge protection circuit 100B.

The server 30 lacks the surge protection circuits 100A and 100B because the first embodiment assumes that the server 30 is placed in an environment in which the server 30 is not expected to be protected from a surge voltage generated due to lightning. To protect the server 30 from a surge voltage generated due to lightning, the surge protection circuits 100A and 100B may be added to the server 30 as with the server 20.

The surge protection circuits 100A and 100B each include terminals 101A, 101B, 102A and 102B. The terminals 101A and 101B of the surge protection circuit 100A are connected to paired signal lines (illustrated by two solid lines) of the high-speed transmission path 10A. Similarly, the terminals 101A and 101B of the surge protection circuit 100B are connected to paired signal lines (illustrated by two solid lines) of the high-speed transmission path 10B.

The terminals 102A and 102B of the surge protection circuit 100A are respectively connected to the paired terminals 41A and 41B of the network card 40A. Similarly, the terminals 102A and 102B of the surge protection circuit 100B are respectively connected to the paired terminals 41A and 41B of the network card 40B.

Since, in the first embodiment, the surge protection circuit 100A or 100B is included in the server 20, if lightning strikes the high-speed transmission path 10A or 10B, the server 20 is protected from a surge voltage generated due to the lightning.

In the descriptions below, when the surge protection circuits 100A and 100B are not distinguished from each other, they will be referred to simply as the surge protection circuit 100. Similarly, when the network cards 40A and 40B are not distinguished from each other, they will be referred to simply as the network card 40; when the network cards 80A and 80B are not distinguished from each other, they will be referred to simply as the network card 80; when the high-speed transmission paths 10A and 10B are not distinguished from each other, they will be referred to simply as the high-speed transmission path 10.

Next, the surge protection circuit 100 in the first embodiment will be described with reference to FIG. 2.

Figure 2:
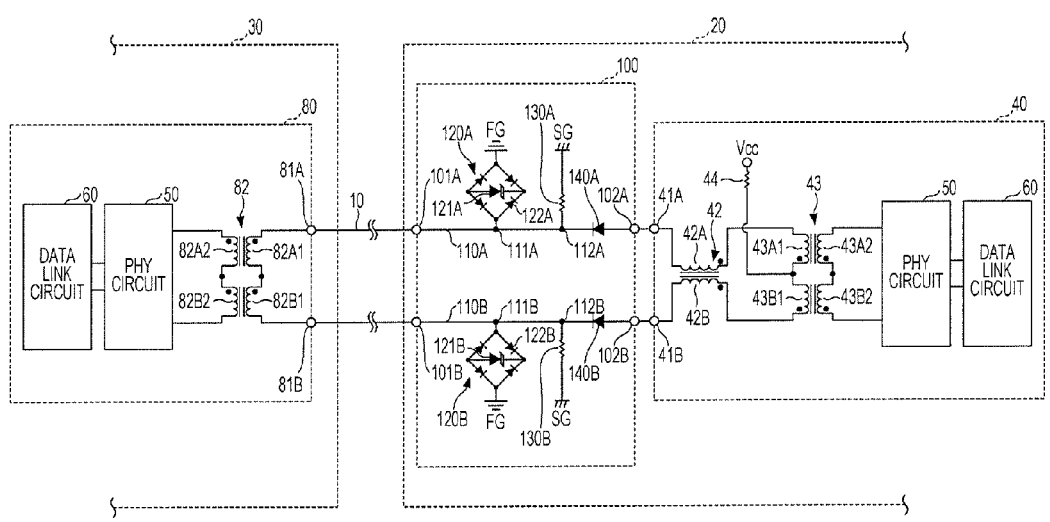
FIG. 2 illustrates a circuit structure in which one surge protection circuit in the first embodiment and its peripheral circuits are included.

FIG. 2 illustrates a circuit structure in which the surge protection circuit 100 in the first embodiment and its peripheral circuits are included.

In FIG. 2, only the network card 40 and surge protection circuit 100 are illustrated as the constituent elements of the server 20 and other constituent elements are not illustrated; only the network card 80 is illustrated as the constituent elements of the server 30 and other constituent elements are not illustrated.

In addition to the terminals 101A, 101B, 102A and 102B, the surge protection circuit 100 includes lines 110A and 110B, clamping circuits 120A and 120B, resistors 130A and 130B, and diodes 140A and 140B.

The terminals 101A and 101B are connected to paired signal lines of the high-speed transmission path 10. Connectors complying with the standard with which the high-speed transmission path 10 complies may be used as the terminals 101A and 101B. The terminals 101A and 101B are an example of a first terminal.

The terminals 102A and 102B, which are respectively connected to the terminals 41A and 41B of the network card 40 as described above, are further connected to a choke coil 42 and a pulse transformer 43 in the network card 40 and then to the PHY circuit 50. The terminals 102A and 102B are an example of s second terminal.

The line 110A and line 110B are paired; the line 110A is connected to the terminals 101A and 102A, and the line 110B is connected to the terminals 101B and 102B. The clamping circuit 120A and resistor 130A are separately connected to lines that branch from the line 110A, and the diode 140A is included in the line 110A. Similarly, the clamping circuit 120B and resistor 130B are separately connected to lines that branch from the line 110B, and the diode 140B is included in the line 110B.

The clamping circuit 120A is included in a line that branches from the line 110A at a branching point 111A and is connected to a frame ground (FG) terminal. The branching point 111A is positioned at a point closer to the terminal 101A than a branching point 112A at which a line including the resistor 130A branches from the line 110A.

The clamping circuit 120B is included in a line that branches from the line 110B at a branching point 111B and is connected to another FG terminal. The branching point 111B is positioned at a point closer to the terminal 101B than a branching point 112B at which a line including the resistor 130B branches from the line 110B.

The clamping circuit 120A is formed by interconnecting a varistor 121A and four diodes 122A like a bridge as illustrated in FIG. 2. Since the four diodes 122A are added to the varistor 121A so as to connect them like a bridge, the stray capacitance of the clamping circuit 120A is significantly reduced when compared with a case in which the varistor 121A is used alone instead of the clamping circuit 120A.

Similarly, the clamping circuit 120B is formed by interconnecting a varistor 121B and four diodes 122B like a bridge as illustrated in FIG. 2. Since the four diodes 122B are added to the varistor 121B so as to connect them like a bridge, the stray capacitance of the clamping circuit 120B is significantly reduced when compared with a case in which the varistor 121B is used alone instead of the clamping circuit 120B.

These clamp circuits 120A and 120B may be, for example, a transient voltage suppression (TVS) element from Semtech Corporation.

If lightning strikes one of the paired signal lines (signal line connected to the terminal 101A) of the high-speed transmission path 10, the clamping circuit 120A clamps a lightning surge voltage, which enters the line 110A from the terminal 101A, to a prescribed voltage (clamping voltage). The clamping voltage of the clamping circuit 120A is, for example, 20 V.

If lightning strikes the other of the paired signal lines (signal line connected to the terminal 101B) of the high-speed transmission path 10, the clamping circuit 120B clamps a lightning surge voltage, which enters the line 110B from the terminal 101B, to a prescribed voltage (clamping voltage). The clamping voltage of the clamping circuit 120B is, for example, 20 V.

The clamping voltages of the clamping circuits 120A and 120B are determined depending on the voltage at which the impedance of the varistors 121A and 121B drops. That is, if the voltage at which the impedance of the varistors 121A and 121B drops is 20 V, the clamping voltage of the clamping circuits 120A and 120B is 20 V.

However, the clamping voltage of the clamping circuits 120A and 120B is not limited to 20 V; the clamping voltage may be a voltage other than 20 V as long as the clamping voltage is lower than the reverse breakdown voltage of the diode 140A.

The resistor 130A is inserted between the branching point 112A on the line 110A and a signal ground (SG) terminal. The resistor 130B is inserted between the branching point 112B on the line 110B and another SG terminal. The line between the branching point 112A and its relevant SG terminal is an example of a signal ground line, and the line between the branching point 112B and its relevant SG terminal is also an example of a signal ground line. The resistors 130A and 130B are an example of a resistor included in the signal ground line.

The resistor 130A leads, to the relevant SG terminal, a bias current that is supplied from a resistor 44 on the network card 40 through the pulse transformer 43 and choke coil 42 to the diode 140A. Similarly, the resistor 130B leads, to the relevant SG terminal, a bias current that is supplied to the diode 140B in the same way.

It suffices for the resistance of the resistor 130A to be set to an appropriate value so that a bias voltage enough to turn on the diode 140A is applied to the diode 140A. Similarly, it suffices for the resistance of the resistor 130B to be set to an appropriate value so that a bias voltage enough to turn on the diode 140B is applied to the diode 140B.

The diode 140A is inserted between the terminal 102A and the branching point 112A on the line 110A. Similarly, the diode 140B is inserted between the terminal 102B and the branching point 112B on the line 110B. The anode of the diode 140A is connected to the terminal 102A and its cathode is connected to the branching point 112A. Similarly, the anode of the diode 140B is connected to the terminal 102B and its cathode is connected to the branching point 112B.

The diode 140A is an example of a first semiconductor switch that has a rectification direction away from the terminal 102A toward the branching point 112A and has a reverse breakdown voltage higher than the clamping voltage of the clamping circuit 120A. Similarly, the diode 140B is an example of a semiconductor switch that has a rectification direction away from the terminal 102B toward the branching point 112B and has a reverse breakdown voltage higher than the clamping voltage of the clamping circuit 120B.

The diode 140A is turned on by a bias voltage that is supplied from a power supply unit Vcc connected to the resistor 44 on the network card 40 through the resistor 44, the pulse transformer 43 and choke coil 42 to the terminal 41A and then terminal 102A. Similarly, the diode 140B is turned on by a bias voltage that is supplied to the terminal 41B in the same way and then terminal 102B in the same way.

With the diode 140A turned on, alternating current signals bi-directionally flow through the diode 140A. With the diode 140B turned on, alternating current signals bi-directionally flow through the diode 140B. With the diodes 140A and 140B turned on, therefore, data is bi-directionally transferred between the terminals 101A and 102A in the surge protection circuit 100 and between the terminals 101B and 102B therein. Data is transferred between the server 20 and the server 30 as alternating current signals.

If a lightning surge voltage enters the line 110A through the terminal 101A, the lightning surge voltage is clamped by the clamping circuit 120A, so an electric potential in a portion between the branching point 111A and the diode 140A becomes equal to the clamping voltage of the clamping circuit 120A. This is also true for a lightning surge voltage that enters the line 110B through the terminal 101B; the lightning surge voltage is clamped by the clamping circuit 120B and an electric potential in a portion between the branching point 111B and the diode 140B becomes equal to the clamping voltage of the clamping circuit 120B.

Accordingly, if a lightning surge voltage enters the lines 110A and 110B through the terminals 101A and 101B, respectively, a clamping voltage of about 20 V is applied to the cathodes of the diodes 140A and 140B.

A reverse bias is applied to the diodes 140A and 140B at this time, turning them off.

The reverse breakdown voltages of the diodes 140A and 140B are higher than the clamping voltages of their respective clamping circuits 120A and 120B, respectively, so the diodes 140A and 140B are not destroyed by the clamping voltages applied to the cathodes of their respective diodes 140A and 140B, keeping the diodes 140A and 140B turned off.

That is, the diodes 140A and 140B are not destroyed by a lightning surge voltage, and since the diodes 140A and 140B are turned off, the network card 40 is protected from the lightning surge voltage.

Accordingly, since the surge protection circuit 100 in the first embodiment is included between the high-speed transmission path 10 and the network card 40, if lightning strikes the high-speed transmission path 10, the surge protection circuit 100 protects the server 20 from a lightning surge voltage.

In addition to the PHY circuit 50 and data link circuit 60, the network card 40 includes the paired terminals 41A and 41B, choke coil 42, pulse transformer 43, and resistor 44.

The choke coil 42 includes two coils denoted by 42A and 42B. The coil 42A is inserted between the terminal 41A and a primary-side coil 43A1 of the pulse transformer 43, and the coil 42B is inserted between the terminal 41B and a primary-side coil 43B1 of the pulse transformer 43. The double line indicated between the two coils 42A and 42B in FIG. 2 indicates a core shared by the two coils 42A and 42B. The two coils 42A and 42B are wound with the same polarity. The choke coil 42 is arranged between the surge protection circuit 100 and the pulse transformer 43 to shut out noise. The noise referred to here indicates, for example, noise that externally enters the high-speed transmission path 10 at its intermediate point.

In addition to the primary-side coils 43A1 and 43B1, the pulse transformer 43 includes secondary-side coils 43A2 and 43B2. The primary-side coil 43A1 and secondary-side coils 43A2 are coupled in an alternating current manner, and the primary-side coil 43B1 and secondary-side coil 43B2 are coupled in an alternating current manner.

The power supply unit Vcc is connected to an intermediate point between the primary-side coils 43A1 and 43B1 through the resistor 44.

The pulse transformer 43 is a wide-band transmission transformer arranged between the choke coil 42 and the PHY circuit 50 to protect the PHY circuit 50 and data link circuit 60 from noise that enters the high-speed transmission path 10.

The resistor 44 is inserted between the power supply unit Vcc and the intermediate point between the primary-side coils 43A1 and 43B1 of the pulse transformer 43. It suffices for the resistance of the resistor 44 to be set to an appropriate value so that a bias voltage enough to turn on the diode 140A is applied to the diode 140A and that a bias voltage enough to turn on the diode 140B is applied to the diode 140B.

The resistance of the resistor 44 has been set so that a voltage applied through the primary-side coil 43A1, choke coil 42 and diode 140A to the branching point 112A becomes a prescribed voltage and that a voltage applied through the primary-side coil 43B1, choke coil 42 and diode 140B to the branching point 112B becomes a prescribed voltage. The voltage at the branching point 112A is equal to the voltage of the diode 140A, and the voltage at the branching point 112B is equal to the voltage of the diode 140B.

A bias current that enters the diode 140A flows from the power supply unit Vcc through the resistor 44, the primary-side coil 43A1 of the pulse transformer 43, the choke coil 42, the terminal 41A, and the terminal 102A into the anode of the diode 140A. Similarly, a bias current that enters the diode 140B flows from the power supply unit Vcc through the resistor 44, the primary-side coil 43B1 of the pulse transformer 43, the choke coil 42, the terminal 41B, and the terminal 102B into the anode of the diode 140B.

Since the signal peak value of data transmitted through the high-speed transmission path 10 is about 1 Vpeak-to-peak (1 Vpp), a bias voltage at the branching points 112A and 112B is a little higher than 2 V.

If the voltage of the power supply unit Vcc is 12 V and the on-current of the diodes 140A and 140B is 1 mA, the resistance R1 of the resistor 130A and the resistance R2 of the resistor 130B are calculated to be about 2.2 kilohms (R1=R2=2 V/1 mA≈2.2 kilohms).

Therefore, the resistance R3 of the resistor 44 is calculated to be about 4.7 kilohms (R3=(Vcc−2 V)/2 mA≈4.7 kilohms). A voltage drop at the diodes 140A and 140B is about 0.6 V.

In addition to the PHY circuit 50 and data link circuit 60, the network card 80 in the server 30 includes a pulse transformer 82. The pulse transformer 82 includes primary-side coils 82A1 and 82B1 and secondary-side coils 82A2 and 82B2. The pulse transformer 82 has the same structure as the pulse transformer 43 except that a bias voltage is not applied to an intermediate point between the primary-side coils 82A1 and 82B1.

As described above, in the surge protection circuit 100 in the first embodiment, a forward bias voltage is applied from the network card 40 to the diode 140A inserted between the branching point 112A and the terminal 102A and to the diode 140B inserted between the branching point 112B and the terminal 102B.

In addition to this forward bias voltage application, the reverse breakdown voltages of the diodes 140A and 140B are set to values higher than the clamping voltages of the clamping circuits 120A and 120B. As the diodes 140A and 140B, diodes having a reverse breakdown voltage of, for example, about 180 V may be selected. For example, the JDP2S12CR (silicon epitaxial PIN-type diode) from Toshiba Semiconductor & Storage Products Company may be used.

The diodes 140A and 140B have a low on-resistance and a small capacity. For example, the product described above has an on-resistance of about 0.4 ohm and a capacity of about 1.0 pF.

Accordingly, the surge protection circuit 100, in which the diode 140A is inserted between the branching point 112A and the terminal 102A and the diode 140B is inserted between the branching point 112B and the terminal 102B, has a small stray capacitance, so the surge protection circuit 100 suppresses deterioration in transmission characteristics and easily adapts to the high-speed transmission path 10.

Since a forward bias voltage is applied from the network card 40 to the diodes 140A and 140B, in a normal operation during which lightning has not struck the high-speed transmission path 10, the diodes 140A and 140B are turned on, enabling alternating current signals to be bi-directionally transmitted.

In the first embodiment, therefore, the surge protection circuit 100 suitable for the high-speed transmission path 10 is provided.

The surge protection circuit 100 in the first embodiment includes the diodes 140A and 140B, which respectively have a reverse breakdown voltage higher than the clamping voltages of the clamping circuits 120A and 120B. Accordingly, if lightning strikes the high-speed transmission path 10, when the diodes 140A and 140B are turned off, the server 20 is efficiently protected from a lightning surge voltage.

Now, a lightning surge test carried out for the server 20 including the surge protection circuit 100 in the first embodiment and test results will be described with reference to FIGS. 3, 4A, and 4B.

Figure 3:
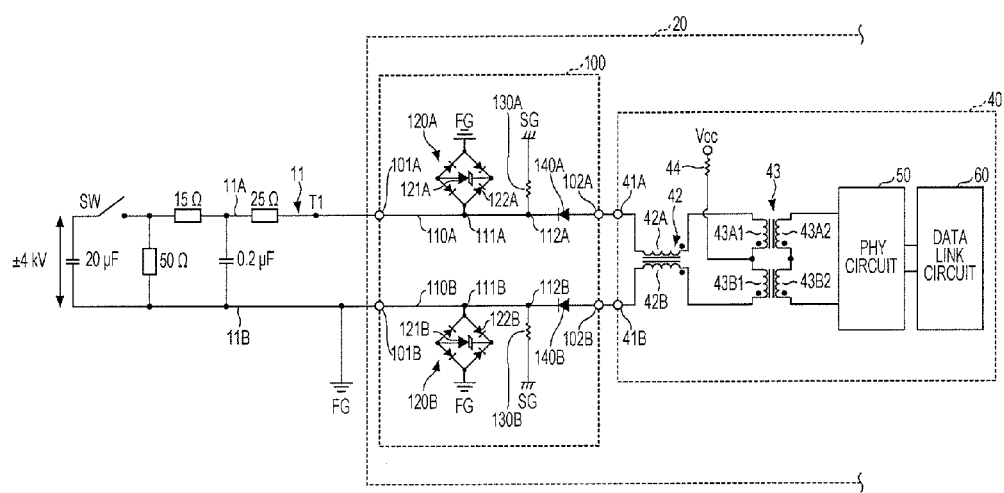
FIG. 3 illustrates a state in which the server including the surge protection circuit in the first embodiment is connected to a test transmission line.

FIG. 3 illustrates a state in which the server 20 including the surge protection circuit 100 in the first embodiment is connected to a test transmission line 11.

As with the high-speed transmission path 10, the test transmission line 11 includes paired lines 11A and 11B. The line 11A includes a switch SW, a resistor with a resistance of 15 ohms, and a resistor with a resistance of 25 ohms. A capacitor with a capacitance of 20 μF, a resistor with a resistance of 50 ohms, and a capacitor with a capacitance of 0.2 μF are connected between the lines 11A and 11B, as illustrated in FIG. 3. The line 11B is connected to an FG terminal.

To test the surge protection circuit 100 connected to this test transmission line 11, the switch SW is closed with the capacitor with a capacitance of 20 μF charged with a voltage of +4 kV or −4 kV to artificially generate a state in which lightning strikes the lines 11A and 11B.

Although, in FIG. 3, the line 11A is connected to the terminal 101A and line 11B is connected to the terminal 101B, test is also carried out by changing these connections so that the line 11A is connected to the terminal 101B and the line 11B is connected to the terminal 101A.

Thus, test in which a lightning surge enters both the terminal 101A and terminal 101B at different times is carried out.

Figures 4A, 4B:
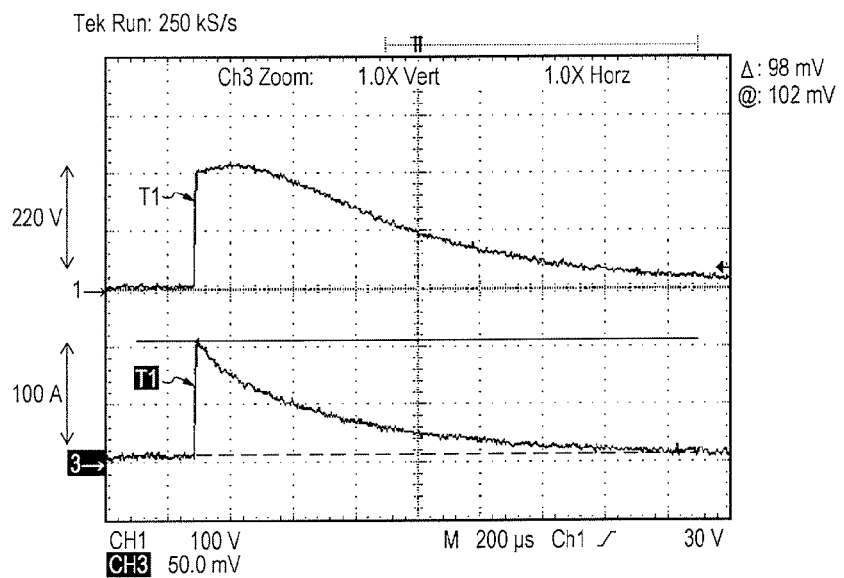
FIGS. 4A and 4B illustrate results of lightning surge test carried out for the surge protection circuit in the first embodiment.

FIGS. 4A and 4B illustrate results of the lightning surge test carried out for the surge protection circuit 100 in the first embodiment; FIG. 4A indicates changes in voltage with time at a point T1 on the line 11A, and FIG. 4B indicates changes in current with time at the point T1 on the line 11A.

A so-called 10/700-μs test was carried out, in which the switch SW is closed with the capacitor with a capacitance of 20 μF charged with a voltage of +4 kV or −4 kV to generate a rising edge of a lightning surge in 10 μs and generate its falling edge in 700 μs.

FIG. 4A indicates changes in voltage with time when a positive voltage relative to the line 11B connected to the FG terminal was applied to the line 11A, and FIG. 4B indicates changes in current with time under the same condition.

As illustrated in FIG. 4A, the surge voltage at the point T1 was raised by 220 V in about 10 μs. As illustrated in FIG. 4B, the surge current at the point T1 was increased abut about 100 A in about 10 μs.

When a case in which lightning stuck the line 11A is considered, a surge voltage of 220 V generated at the point T1 is clamped to 20 V by the clamping circuit 120A. When the cathode voltage of the diode 140A is raided to 20 V, the diode 140A is turned off.

Therefore, the surge protection circuit 100 in the first embodiment shuts down the lightning surge.

A surge protection circuit used for comparison purposes will be described with reference to FIG. 5.

Figure 5:
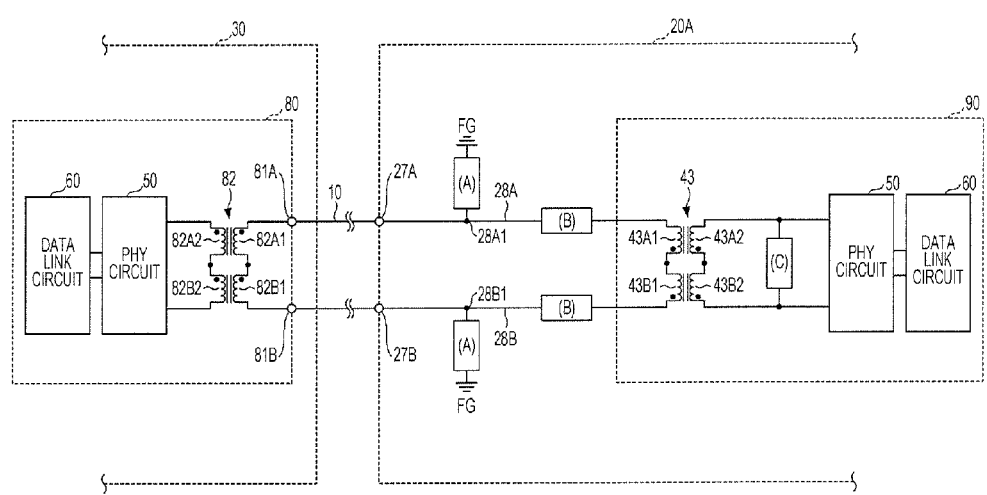
FIG. 5 illustrates a surge protection circuit used for comparison purposes.

FIG. 5 illustrates a surge protection circuit used for comparison purposes. In FIG. 5, the same constituent elements as in FIG. 2 are denoted by the same reference characters and their descriptions will be omitted.

The server 20A in FIG. 5 includes paired terminals 27A and 27B, paired lines 28A and 28B, and a network card 90. The server 20A also includes circuits (A), a circuit (B), and circuits (C) as surge protection circuits. The circuit (C) is included on the network card 90. The network card 90 includes the pulse transformer 43, PHY circuit 50, and data link circuit 60.

The paired terminals 27A and 27B of the server 20A are connected to the server 30 through the high-speed transmission path 10. The network card 90 is connected to the paired terminals 27A and 27B through the lines 28A and 28B.

One circuit (A) is included in a line that branches from a branching point 28A1 on the line 28A to a relevant FG terminal, and another circuit (A) is included in a line that branches from a branching point 28B1 on the line 28B to another FG terminal. One circuit (B) is included in the line 28A between the branching point 28A1 and the primary-side coil 43A1 of the pulse transformer 43 on the network card 90, and another circuit (B) is included in the line 28B between the branching point 28B1 and the primary-side coil 43B1 of the pulse transformer 43.

The circuit (C) is connected between paired lines arranged between the PHY circuit 50 and the secondary-side coils 43A2 and 43B2 of the pulse transformer 43 on the network card 90. That is, the circuit (C) is connected in parallel to the secondary-side coils 43A2 and 43B2.

It may be considered that a varistor, for example, is used as the circuit (A) in this type of surge protection circuit for comparison purposes. The varistor used as the circuit (A) is similar to the varistors 121A and 121B included in the clamping circuits 120A and 120B in the surge protection circuit 100 in the first embodiment. When a voltage higher than or equal to a prescribed value is applied to the varistor, its impedance is reduced, so a current generated due to a lightning surge is led to the FG terminal.

Since, however, the varistor itself has a large stray capacitance of, for example, several hundred picofarads, if the varistor is connected to the high-speed transmission path 10, which performs high-speed data transmission on the order of 1 Gbps, as an internal electronic part of the server 20A, the transmission waveform of the data has a large distortion. Therefore, it is difficult to use the varistor as a surge protection circuit for the high-speed transmission path 10.

It may also be considered that a gas tube is used in the circuit (A). The gas tube, which uses the discharge phenomenon of a gas, is usually used as a surge protection element. Since the gas tube has a relatively high clamping voltage of about 90 V, however, a surge voltage (surge current) may not be completely shut down and the primary-side coils 43A1 and 43B1 of the pulse transformer 43 may be thereby damaged. In addition, there is a delay time of about 10 μs before clamping takes effect, so the pulse transformer 43 may be more severely damaged.

Accordingly, the circuit (A) in which a gas tube is used is not suitable as the surge protection circuit for the high-speed transmission path 10.

It may also be considered that a polyswitch is used in the circuit (B). The polyswitch is generally a thermistor having a positive temperature coefficient. The polyswitch is an element the resistance of which is rapidly increased when the element temperature is raised beyond a certain temperature. Since the resistance of the element is increased due to its temperature rise, the element is used to protect another element from an overcurrent and the like.

However, there is a delay time of about 500 μs before a lightning surge voltage (lightning surge current) is shut down due to an increase in resistance, so the polyswitch is not suitable to the high-speed transmission path 10, which performs high-speed data transmission. In addition, since the breakdown voltage of the polyswitch is about 60 V, it may be damaged due to a lightning surge voltage. Accordingly, it is hard to say that the polyswitch is sufficiently eligible as a surge protection circuit that protects the high-speed transmission path 10 from a lightning surge.

It may also be considered that a surge absorber is used in the circuit (C). The surge absorber is generally an element that has a high resistance in normal times. When a voltage higher than or equal to a certain value is applied to the surge absorber, however, its resistance is rapidly reduced. Therefore, the surge absorber is used to limit a voltage to be applied.

Since the power supply voltage of the PHY circuit 50 is low, however, it is difficult to use a surge absorber to clamp a lightning surge voltage to or below the power supply voltage of the PHY circuit 50.

Thus, it is difficult to use the surge protection circuit used for comparison purposes, which includes the circuits (A), (B), and (C), to adequately protect the high-speed transmission path 10 from a lightning surge.

In contrast, in the surge protection circuit 100 (see FIG. 2) in the first embodiment, a forward bias voltage is applied from the network card 40 to the diode 140A inserted between the branching point 112A and the terminal 102A and to the diode 140B inserted between the branching point 112B and the terminal 102B.

In addition to the application of this forward bias voltage, the reverse breakdown voltages of the diodes 140A and 140B have been set to voltages higher than clamping voltages of their respective clamping circuits 120A and 120B.

In the first embodiment, therefore, the surge protection circuit 100 suitable for the high-speed transmission path 10 is provided.

So far, a mode in which the diodes 140A and 140B are used as an example of semiconductor switches has been described. However, this is not a limitation; if other elements have the same rectification direction as the diodes 140A and 140B, have reverse breakdown voltages equivalent to the reverse breakdown voltages of the diodes 140A and 140B, and have a stray capacitance as small as that of the diodes 140A and 140B, these elements may be used instead of the diodes 140A and 140B.

Although a mode in which the surge protection circuits 100 (100A and 100B) are included in the interior of the server 20 has been described, the surge protection circuits 100 may be arranged outside the server 20 and may be connected to the high-speed transmission paths 10.

Although a mode in which in the surge protection circuit 100, the diode 140A is included in the line 110A and the diode 140B is included in the line 110B has been described, this is not a limitation; if it is sufficient that only the diode 140A or diode 140B is included in any one of the lines 110A and 110B, the surge protection circuit 100 may include only any one of the diodes 140A and 140B. If, for example, any one of the lines 110A and 110B is not expected to be protected from a lightning surge, the surge protection circuit 100 may be structured so as to include only any one of the diodes 140A and 140B. In this structure, only any one of the clamping circuits 120A and 120B and only one of the resistors 130A and 130B may be used.

Second Embodiment

Figure 6:
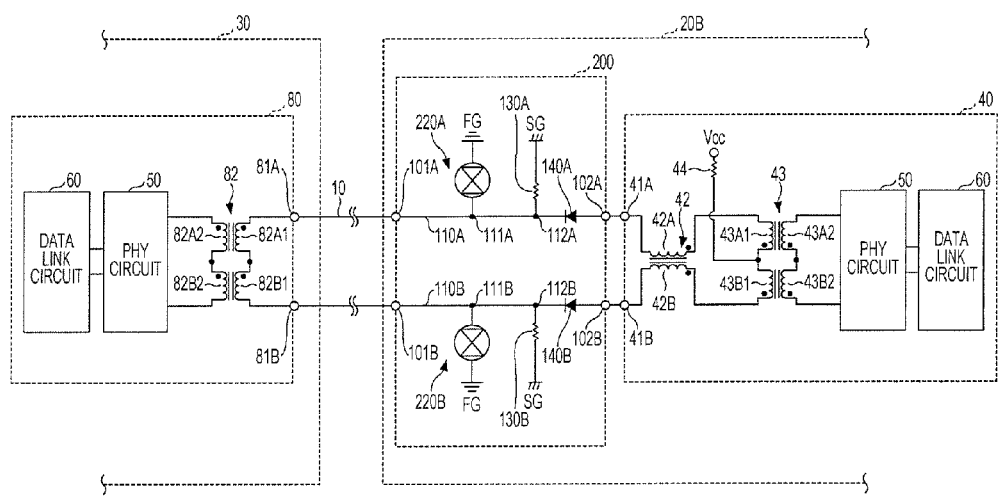
FIG. 6 illustrates a surge protection circuit in a second embodiment and its peripheral circuits.

FIG. 6 illustrates a surge protection circuit 200 in a second embodiment and its peripheral circuits.

The surge protection circuit 200 in the second embodiment is included in a server 20B. The server 20B in the second embodiment has the same structure as the server 20 (see FIGS. 1 and 2) in the first embodiment except that the surge protection circuit 100 in the server 20 in the first embodiment has been replaced with the surge protection circuit 200.

The surge protection circuit 200 includes the terminals 101A, 101B, 102A and 102B, the lines 110A and 110B, gas tubes 220A and 220B, the resistors 130A and 130B, and diodes 140A and 140B.

That is, in the surge protection circuit 200 in the second embodiment, the clamping circuits 120A and 120B in the surge protection circuit 100 in the first embodiment have been replaced with the gas tubes 220A and 220B. The gas tubes 220A and 220B are an example of a clamping circuit.

If there is no lightning surge, the diodes 140A and 140B in the surge protection circuit 200 in the second embodiment are turned on by a forward bias voltage supplied from the network card 40 as with the surge protection circuit 100 in the first embodiment, so the surge protection circuit 200 operates in the same way as the surge protection circuit 100.

If a lighting surge is generated in the high-speed transmission path 10 and a lightning surge voltage enters the line 110A or 110B from the terminal 101A or terminal 101B, the gas tube 220A or 220B clamps the lightning surge voltage present in the line 110A or line 110B to about 90 V.

A reverse bias voltage is applied to the diode 140A or diode 140B, which corresponds to the terminal 101A or terminal 101B, whichever has received the lightning surge voltage, to turn off the diode 140A or 140B. Accordingly, the lightning surge is shut off by the gas tube 220A or 220B and the diode 140A or 140B.

In the second embodiment, therefore, the network card 40 is protected from a lightning surge as in the first embodiment. This enables the server 20B to be protected from a lightning surge.

The gas tubes 220A and 220B used in the surge protection circuit 200 in the second embodiment take a delay time of about 10 μs before clamping takes effect when compared with the clamping circuits 120A and 120B used in the surge protection circuit 100 in the first embodiment.

However, the diodes 140A and 140B have a high reverse breakdown voltage, which is about 180 V. Even if the gas tubes 220A and 220B have a little delay time, therefore, the surge protection circuit 200 shuts down a lightning surge and protects the server 20B from a lightning surge.

Thus, since the diode 140A having a small stray capacitance is inserted between the branching point 112A and the terminal 102A and the diode 140B having a small stray capacitance is inserted between the branching point 112B and the terminal 102B, the surge protection circuit 200 in the second embodiment suppresses deterioration in transmission characteristics and easily adapts to the high-speed transmission path 10 as with the surge protection circuit 100 in the first embodiment.

In the second embodiment, therefore, the surge protection circuit 200 suitable for the high-speed transmission path 10 is provided.

Third Embodiment

Figure 7:
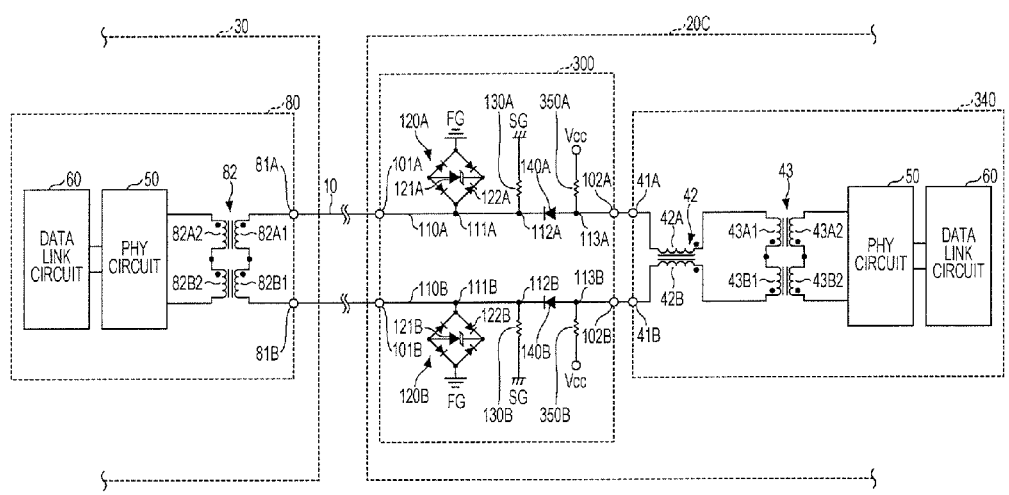
FIG. 7 illustrates a surge protection circuit in a third embodiment and its peripheral circuits.

FIG. 7 illustrates a surge protection circuit 300 in a third embodiment and its peripheral circuits.

The surge protection circuit 300 in the third embodiment is included in a server 20C. The server 20C in the third embodiment includes a surge protection circuit 300 and a network card 340.

The server 20C in the third embodiment has the same structure as the server 20 (see FIGS. 1 and 2) in the first embodiment except that the surge protection circuit 100 and network card 40 in the server 20 in the first embodiment have been respectively replaced with the surge protection circuit 300 and network card 340.

The surge protection circuit 300 includes the terminals 101A, 101B, 102A and 102B, the lines 110A and 110B, the clamping circuits 120A and 120B, the resistors 130A and 130B, the diodes 140A and 140B, and resistors 350A and 350B.

That is, in the surge protection circuit 300 in the third embodiment, the resistor 350A, which is included in a line between a branching point 113A and a power supply unit Vcc, and the resistor 350B, which is included in a line between a branching point 113B and another power supply unit Vcc, have been added to the surge protection circuit 100 in the first embodiment.

The surge protection circuit 300 has the resistor 350A, which is included in the line between the branching point 113A and its relevant power supply unit Vcc, to apply a forward bias voltage to the diode 140A, and also has the resistor 350B, which is included in the line between the branching point 113A and its relevant power supply unit Vcc, to apply a forward bias voltage to the diode 140B.

The network card 340 included in the server 20C in the third embodiment has a structure in which the line including the resistor 44 (see FIG. 2) between a power supply unit Vcc and the intermediate point between the primary-side coils 43A1 and 43B1 has been removed from the network card 40 included in the server 20 in the first embodiment.

The reason why the line including the resistor 44 (see FIG. 2) between a power supply unit Vcc and the intermediate point between the primary-side coils 43A1 and 43B1 has been removed is that since a surge protection circuit 350 includes a circuit that applies a forward bias to the diodes 140A and 140B, the use of the line has no effect unlike the network card 40 included in the server 20 in the first embodiment.

If there is no lightning surge, the surge protection circuit 300 operates so that a forward bias voltage is applied from the relevant power supply unit Vcc through the resistor 350A and branching point 113A to the diode 140A. A bias current passing through the diode 140A in the forward direction flows through the branching point 112A and resistor 130A to the relevant SG terminal.

Similarly, if there is no lightning surge, a forward bias voltage is applied from the relevant power supply unit Vcc through the resistor 350B and branching point 113B to the diode 140B. A bias current passing through the diode 140B in the forward direction flows through the branching point 112B and resistor 130B to the relevant SG terminal.

Thus, if there is no lightning surge, the diodes 140A and 140B are turned on, so bi-directional data communication may be carried out between the server 20C and the server 30 through the high-speed transmission path 10 as with the surge protection circuit 100 in the first embodiment.

If lightning strikes the high-speed transmission path 10 and a lighting surge thereby occurs, a lightning surge voltage is clamped by the clamping circuit 120A or 120B and a reverse bias is applied to the diodes 140A and 140B due to a clamping voltage, as with the surge protection circuit 100 in the first embodiment, turning off the diodes 140A and diode 140B.

Accordingly, the lightning surge voltage is shut down by the surge protection circuit 300. The surge protection circuit 300 thereby protects the network card 340 and the server 20C, which includes the network card 340.

Thus, since the diode 140A having a small stray capacitance is inserted between the branching point 112A and the terminal 102A and the diode 140B having a small stray capacitance is inserted between the branching point 112B and the terminal 102B, the surge protection circuit 300 in the third embodiment suppresses deterioration in transmission characteristics and easily adapts to the high-speed transmission path 10 as with the surge protection circuit 100 in the first embodiment.

In the third embodiment, therefore, the surge protection circuit 300 suitable for the high-speed transmission path 10 is provided.

It suffices for the resistances of the resistors 350A and 350B to be set to an appropriate value so that a bias voltage enough to turn on the diode 140A is applied to the diode 140A and that a bias voltage enough to turn on the diode 140B is applied to the diode 140B, as with the resistor 44 on the network card 40 included in the server 20 in the first embodiment.

Since the signal peak value of data transmitted through the high-speed transmission path 10 is about 1 Vpeak-to-peak (1 Vpp), a bias voltage at the branching points 112A and 112B is a little higher than 2 V as in the first embodiment.

If the voltage of the power supply unit Vcc is 12 V and the on-current of the diodes 140A and 140B is 1 mA, the resistance R1 of the resistor 130A and the resistance R2 of the resistor 130B are calculated to be about 2.2 kilohms (R1=R2=2 V/1 mA≈2.2 kilohms), as in the first embodiment.

Therefore, the resistance R4 of the resistor 350A and the resistance R5 of the resistor 350B are calculated to be about 10 kilohms (R4=R5=Vcc−2 V)/1 mA≈10 kilohms).

Accordingly, it suffices for the resistance R4 of the resistor 350A and the resistance of the R5 of the resistor 350B to be set to, for example, about 10 kilohms.

Fourth Embodiment

Figure 8:
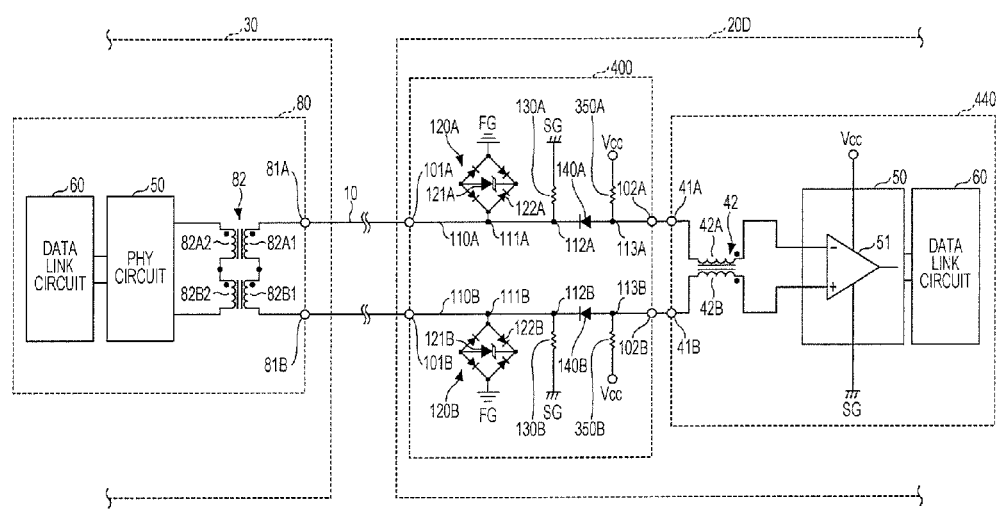
FIG. 8 illustrates a surge protection circuit in a fourth embodiment and its peripheral circuits.

FIG. 8 illustrates a surge protection circuit 400 in a fourth embodiment and its peripheral circuits.

The surge protection circuit 400 in the fourth embodiment is included in a server 20D. The server 20D in the fourth embodiment includes a surge protection circuit 400 and a network card 440.

The server 20D in the fourth embodiment has the same structure as the server 20C (see FIG. 7) in the third embodiment except that the surge protection circuit 300 and network card 340 in the server 20C in the third embodiment have been respectively replaced with the surge protection circuit 400 and network card 440.

The surge protection circuit 400 includes the terminals 101A, 101B, 102A and 102B, the lines 110A and 110B, the clamping circuits 120A and 120B, the resistors 130A and 130B, the diodes 140A and 140B, and resistors 350A and 350B.

That is, the surge protection circuit 400 in the fourth embodiment includes the same constituent elements as the surge protection circuit 300 in the third embodiment. The resistances of the resistors 130A and 130B and the resistors 350A and 350B in the surge protection circuit 400 differ from the resistances of the corresponding resistors in the surge protection circuit 300 in the third embodiment.

The network card 440 differs from the network card 340 in the third embodiment in that the network card 440 lacks the pulse transformer 43 (see FIG. 7). The network card 440 includes the paired terminals 41A and 41B, choke coil 42, and PHY circuit 50, and data link circuit 60.

In FIG. 8, an operational amplifier 51 is included in the interior of the PHY circuit 50. The operational amplifier 51, which receives electric power from a power supply unit Vcc, is connected to an SG terminal. During analog-to-digital (AD) conversion and digital-to-analog (DA) conversion of data, the operational amplifier 51 receives data entered through the high-speed transmission path 10, amplifies the data, and output the amplified data to the data link circuit 60.

The voltage of the power supply unit Vcc connected to the PHY circuit 50 will be denoted by Vcc, the bias voltage (voltage drop) of the diodes 140A and 140B will be denoted by Vd, and the on-current (bias current) of the diodes 140A and 140B will be denoted by I.

Then, the resistance R1 of the resistor 130A and the resistance R2 of the resistor 130B are each (Vcc/2−Vd)/I, and the resistance R4 of the resistor 350A and the resistance R5 of the resistor 3506 are each (Vcc/2)/I.

The reason why the (Vcc/2), which is a half of the power supply voltage Vcc, is used as a voltage in the calculation of the resistance R1 of the resistor 130A, the resistance R2 of the resistor 130B, the resistance R4 of the resistor 350A, and the resistance R5 of the resistor 3506 is so that data transmitted through the high-speed transmission path 10 has as large a signal peak value (peak-to-peak value) as possible.

Since, in the server 20D in the fourth embodiment, the network card 440 lacks the pulse transformer 43 (see FIG. 7), the voltage of the power supply unit Vcc is 2.5 V and the electric potential at the branching points 112A and 112B is 1.3 V.

Under these conditions, the resistance R1 of the resistor 130A and the resistance R2 of the resistor 130B are each (1.3-0.6)/I, and the resistance R4 of the resistor 350A and the resistance R5 of the resistor 350B are each about 1.2×I. Thus, R1 is about 0.583×R4.

If the characteristic impedance of the high-speed transmission path 10 is denoted by Zn, then Zn is represented by R1×R4/(R1+R4). If the characteristic impedance Zn of the high-speed transmission path 10 is 100 ohms, it is found that 100 ohms is sufficient as the combined resistance of the resistors 130A and 130B and the resistors 350A and 350B.

Accordingly, the combined resistance of the resistor 130A (resistance R1) and resistor 350A (resistance R4) is 200 ohms.

Since R1×R4/(R1+R4) is 200 ohms and R1 is about 0.583× R4 ohms, R4 is 560 ohms (200×1.583/0.583=543≈560). Since R1 is about 0.583×R4, R1 is 330 ohms.

Thus, it suffices for the resistance R1 of the resistor 130A and the resistance R2 of the resistor 130B to be set to 330 ohms and the resistance R4 of the resistor 350A and the resistance R5 of the resistor 350B to be set to 560 ohms.

Since R4=R5≈1.2×I, the bias current I flowing in the diodes 140A and 140B at this time is calculated to be 2.1 mA by equation I=1.2/R4.

When the voltage (Vcc) of the power supply unit Vcc, the resistance R1 of the resistor 130A, the resistance R2 of the resistor 130B, the resistance R4 of the resistor 350A, and the resistance R5 of the resistor 350B are set as described above as an example, the surge protection circuit 400 in the fourth embodiment operates as with the surge protection circuit 300 in the third embodiment.

Thus, since the diode 140A having a small stray capacitance is inserted between the branching point 112A and the terminal 102A and the diode 140B having a small stray capacitance is inserted between the branching point 112B and the terminal 102B, the surge protection circuit 400 in the fourth embodiment suppresses deterioration in transmission characteristics and easily adapts to the high-speed transmission path 10 as with the surge protection circuit 300 in the third embodiment.

In the fourth embodiment, therefore, the surge protection circuit 400 suitable for the high-speed transmission path 10 is provided.

Fifth Embodiment

Figure 9:
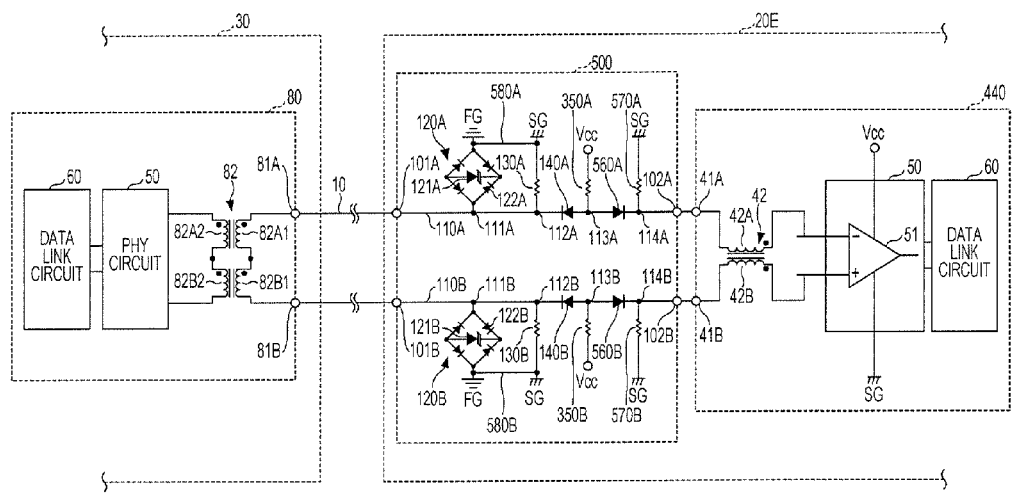
FIG. 9 illustrates a surge protection circuit in a fifth embodiment and its peripheral circuits.

FIG. 9 illustrates a surge protection circuit 500 in a fifth embodiment and its peripheral circuits.

The surge protection circuit 500 in the fifth embodiment is included in a server 20E. The server 20E in the fifth embodiment includes a surge protection circuit 500 and the network card 440.

The server 20E in the fifth embodiment has the same structure as the server 20D (see FIG. 8) in the fourth embodiment except that the surge protection circuit 400 in the server 20D in the fourth embodiment has been replaced with the surge protection circuit 500.

The surge protection circuit 500 includes the terminals 101A, 101B, 102A and 102B, the lines 110A and 110B, the clamping circuits 120A and 120B, the resistors 130A and 130B, the diodes 140A and 140B, the resistors 350A and 350B, diodes 560A and 560B, resistors 570A and 570B, and lines 580A and 580B.

That is, the surge protection circuit 500 in the fifth embodiment has a structure in which the diodes 560A and 560B, the resistors 570A and 570B, and the lines 580A and 580B have been added to the surge protection circuit 400 in the fourth embodiment.

Since the diodes 560A and 560B, resistors 570A and 570B, and lines 580A and 580B have been added to the surge protection circuit 500 as described above, the resistances of the resistors 130A and 130B differ from the corresponding resistances in the surge protection circuit 400 in the fourth embodiment.

The diode 560A is inserted between the branching point 113A and the terminal 102A, and the diode 560B is inserted between the branching point 113B and the terminal 102B. The diodes 560A and 560B are an example of a second semiconductor switch.

The anodes of the diodes 560A and 560B are respectively connected to the branching points 113A and 113B, the cathodes of the diodes 560A and 560B are respectively connected to the terminals 102A and 102B.

That is, the diode 560A has a rectification direction away from the branching point 113A toward the terminal 102A, and the diode 560B has a rectification direction away from the branching point 113B toward the terminal 102B. These directions are reverse to the rectification directions of the diodes 140A and 140B.

The diodes 560A and 560B each have a bias voltage (voltage drop) Vd (=0.6 V) equal to the bias voltage in the diodes 140A and 140B.

The resistor 570A is included in a line between a branching point 114A and an SG terminal, and the resistor 570B is included in a line between a branching point 114B and another SG terminal. The branching point 114A is a point, between the cathode of the diode 560A and the terminal 102A, at which the line including the resistor 570A branches from the line 110A, and the branching point 114B is a point, between the cathode of the diode 560B and the terminal 102B, at which the line including the resistor 570B branches from the line 110B.

The resistor 570A is inserted between the relevant SG terminal and the branching point 114A on the line 110A, and the resistor 570B is inserted between the relevant SG terminal and the branching point 114B on the line 110B. The resistor 570A leads, to the relevant SG terminal, a forward bias current that flows from the relevant power supply unit Vcc through the resistor 350A into the diode 560A. Similarly, the resistor 570B leads, to the relevant SG terminal, a forward bias current that flows from the relevant power supply unit Vcc through the resistor 350B into the diode 560B.

It suffices for the resistance of the resistor 570A to be set to an appropriate value so that a bias voltage enough to turn on the diode 560A is applied to the diode 560A. Similarly, it suffices for the resistance of the resistor 570B to be set to an appropriate value so that a bias voltage enough to turn on the diode 560B is applied to the diode 560B.

The line 580A interconnects the FG terminal connected to the clamping circuit 120A and the SG terminal connected to the resistor 130A, and the line 580B interconnects the FG terminal connected to the clamping circuit 120B and the SG terminal connected to the resistor 130B.

It will be assumed here that the voltage of the power supply unit Vcc for the PHY circuit 50 is 2.5 V, the electric potential at the branching points 112A and 112B, which are respectively connected to the cathodes of the diodes 140A and 140B, is 0.7 V, and the on-current (bias current) of the diodes 140A, 140B, 560A, and 560B is I. The bias voltage (voltage drop) of the diodes 140A and 140B is 0.6 V.

If there is no lightning surge, the diodes 140A and 560A are turned on by a bias voltage supplied from the relevant power supply unit Vcc through the resistor 350A and the diodes 140B and 560B are turned on by a bias voltage supplied from the relevant power supply unit Vcc through the resistor 350B. In the fifth embodiment, the resistor 350A is an example of a resistor that is included in a power supply line that applies a forward bias voltage to the diodes 140A and 560A and the resistor 350B is also an example of a resistor that is included in a power supply line that applies a forward bias voltage to the diodes 140B and 560B.

Due to the symmetry of the circuit, the resistance R1 of the resistor 130A, the resistance R2 of the resistor 130B, the resistance R6 of the resistors 570A, and the resistance R7 of the resistor 570B have the same value.

Therefore, the resistance R1 of the resistor 130A, the resistance R2 of the resistor 130B, the resistances R6 of the resistors 570A and the resistance R7 of the resistor 570B are each 0.7 V/I (R1=R2=R6=R7).

The resistance R4 of the resistor 350A and the resistance R5 of the resistor 350B are each 0.6 V/I (=1.2 V/2 I).

Therefore, 0.7 V/R1 is equal to 0.6/R4, so R1 is calculated to be 1.167×R4 (=(0.7/0.6)×R4).

If the characteristic impedance Zn of the high-speed transmission path 10 is 100 ohms, it is found that 100 ohms is sufficient as the combined resistance of the resistors 130A and 130B, the resistors 350A and 350B, and the resistors 570A and 570B.

That is, 100 ohms is sufficient as the combined resistance of R1, R2, R4, R5, R6, and R7.

Accordingly, 200 ohms is sufficient as the combined resistance of the resistor 130A (resistance R1), resistor 350A (resistance R4), and resistor 570A (resistance R6).

If the combined resistance of the resistor 130A (resistance R1) and resistor 570A (resistance R6) is R16, then R16 is 0.583×R4 (=R1/2). Therefore, R16×R4/(R16+R4) yields 200.

Therefore, 0.583×R4/1.583 yields 200 and R4 is calculated to be about 560 ohms (200×1.583/0.583≈543≈560).

Thus, it suffices for the resistance R4 of the resistor 350A and the resistance R5 of the resistor 350B to be set to 560 ohms.

Since R1 is 1.167×R4, 680 ohms 634 ohms) is sufficient as R1. Thus, it suffices for the resistance R1 of the resistor 130A and the resistance R2 of the resistor 130B to be set to 680 ohms.

The bias current I flowing through the diodes 140A, 140B, 560A, and 560B at this time is 1.1 mA (0.6/R4=1.1).

When the voltage (Vcc) of the power supply unit Vcc, the resistance R1 of the resistor 130A, the resistance R2 of the resistor 130B, the resistance R4 of the resistor 350A, the resistance R5 of the resistor 350B, the resistance R6 of the resistor 570A, and the resistance R7 of the resistor 570B are set as described above as an example, the surge protection circuit 500 in the fifth embodiment operates as with the surge protection circuit 400 in the fourth embodiment.

That is, in normal times during which there is no lightning surge, the diodes 140A, 140B, 560A, and 560B are turned on, so the surge protection circuit 500 performs bi-directional data communication through the line 110A arranged between the terminals 101A and 102A and through the line 110B arranged between the terminals 101B and 102B.

Thus, bi-directional data communication is carried out between the server 20E and the server 30 through the surge protection circuit 500 and high-speed transmission path 10.

The diodes 560A and 560B have a small stray capacitance as with the diodes 140A and 140B, so even if the surge protection circuit 500 in the fifth embodiment is connected to the high-speed transmission path 10, the surge protection circuit 500 suppresses deterioration in transmission characteristics as in the fourth embodiment.

If a lightning strikes the high-speed transmission path 10 and a lighting surge thereby occurs, a lightning surge voltage is clamped by the clamping circuit 120A or clamping circuit 120B and a reverse bias is applied to the diodes 140A and diode 140B due to a clamping voltage, as with the surge protection circuit 400 in the fourth embodiment, turning off the diodes 140A and diode 140B.

The lightning surge voltage is then shut down by the surge protection circuit 500. Accordingly, the surge protection circuit 500 protects the network card 440 and the server 20E, which includes the network card 440.

Thus, since the diode 140A and diode 560A, which have a small stray capacitance are inserted between the branching point 112A and the terminal 102A, and the diode 140B and diode 560B, which have a small stray capacitance are inserted between the branching point 112B and the terminal 102B, the surge protection circuit 500 in the fifth embodiment suppresses deterioration in transmission characteristics and easily adapts to the high-speed transmission path 10 as with the surge protection circuit 400 in the fourth embodiment.

In the fifth embodiment, therefore, the surge protection circuit 500 suitable for the high-speed transmission path 10 is provided.

So far, surge protection circuits and communication apparatuses in the exemplary embodiments of the present disclosure have been described, but the present disclosure is not limited to the embodiments that have been specifically disclosed. Various variations and modifications may be made without departing from the scope defined in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A surge protection circuit comprising:
a first terminal coupled to a transmission path;
a second terminal coupled to a PHY circuit to transfer a signal on a physical layer;
a clamping unit coupled so as to branch from a first line between the first terminal and the second terminal, the clamping unit being configured to clamp a voltage applied to the first terminal to a clamping voltage;
a first semiconductor switch that is disposed between the second terminal and a branching point at which the clamping unit branches from the first line, the first semiconductor switch being configured to have a rectification direction away from the second terminal toward the first terminal and a higher reverse breakdown voltage than the clamping voltage of the clamping unit; and
a resistor, one end of the resistor being coupled to the first line between the clamping unit and the first semiconductor switch, and the other end of the resistor being coupled to a signal ground line.

2. The surge protection circuit according to claim 1, wherein a forward bias voltage is applied to the first semiconductor switch from the second terminal or from a point between the first semiconductor switch.

3. The surge protection circuit according to claim 2, further comprising: a power supply line that branches at a point, on the first line, between the first semiconductor switch and the second terminal and is coupled to a power supply unit, the forward bias voltage being applied to the first semiconductor switch through the power supply line.

4. The surge protection circuit according to claim 2, wherein the first semiconductor switch comprises a diode that has a rectification direction away from the second terminal toward the first terminal.

5. The surge protection circuit according to claim 3, wherein the first semiconductor switch comprises a diode that has a rectification direction away from the second terminal toward the first terminal.

6. The surge protection circuit according to claim 1, further comprising:
a second semiconductor switch that is disposed between the first semiconductor switch and the second terminal, the second semiconductor switch having a rectification direction away from the first semiconductor switch toward the second terminal; and
wherein a forward bias voltage is applied to the first semiconductor switch and to the second semiconductor switch from a connection point between the first semiconductor switch and the second semiconductor switch.

7. The surge protection circuit according to claim 1, wherein the clamping unit comprises a gas tube or a bridge circuit in which a varistor and four diodes are connected.

8. A communication apparatus comprising:
a PHY circuit configured to transfer a signal on a physical layer;
a computation processing unit that is coupled to the PHY circuit; and
a surge protection circuit coupled to the PHY circuit, wherein the surge protection circuit includes:
a first terminal coupled to a transmission path,
a second terminal coupled to the PHY circuit,
a clamping unit coupled so as to branch from a line between the first terminal and the second terminal, the clamping unit being configured to clamp a voltage applied to the first terminal to a clamping voltage,
a first semiconductor switch that is disposed between the second terminal and a branching point at which the clamping unit branches from the line, the first semiconductor switch being configured to have a rectification direction away from the second terminal toward the first terminal and a higher reverse breakdown voltage than the clamping voltage of the clamping unit, and a resistor, one end of the resistor being coupled to the line between the clamping unit and the semiconductor switch, and the other end of the resistor being coupled to a signal ground line.

9. The communication apparatus according to claim 8, wherein a forward bias voltage is applied to the first semiconductor switch from the second terminal or from a point between the first semiconductor switch and the second terminal.

10. The communication apparatus according to claim 9, wherein the surge protection circuit further comprises a power supply line that branches at a point on the line between the first semiconductor switch and the second terminal and is coupled to a power supply unit, the forward bias voltage being applied to the first semiconductor switch through the power supply line.

11. The communication apparatus according to claim 9, wherein the first semiconductor switch comprises a diode that has a rectification direction away from the second terminal toward the first terminal.

12. The communication apparatus according to claim 10, wherein the first semiconductor switch comprises a diode that has a rectification direction away from the second terminal toward the first terminal.

13. The communication apparatus according to claim 8, wherein:

the surge protection circuit further comprises a second semiconductor switch that is disposed between the first semiconductor switch and the second terminal, the second semiconductor switch having a rectification direction away from the first semiconductor switch toward the second terminal; and a forward bias voltage is applied to the first semiconductor switch and to the second semiconductor switch from a connection point between the first semiconductor switch and the second semiconductor switch.

14. The communication apparatus according to claim 8, wherein the clamping unit comprises a gas tube or a bridge circuit in which a varistor and four diodes are connected.

* * * * *